United States Patent
Mihovilovic

(10) Patent No.: US 11,483,215 B2
(45) Date of Patent: *Oct. 25, 2022

(54) USER INTERFACE FOR VIEWING ITEMS IN A SYNCHRONIZATION SYSTEM

(71) Applicant: Dropbox, Inc., San Francisco, CA (US)

(72) Inventor: Domingo A. Mihovilovic, Menlo Park, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/177,982

(22) Filed: Feb. 17, 2021

(65) Prior Publication Data

US 2021/0168045 A1   Jun. 3, 2021

Related U.S. Application Data

(63) Continuation of application No. 16/917,653, filed on Jun. 30, 2020, now Pat. No. 10,938,670, which is a (Continued)

(51) Int. Cl.
*G06F 3/0482* (2013.01)
*H04L 41/22* (2022.01)
(Continued)

(52) U.S. Cl.
CPC ............ *H04L 41/22* (2013.01); *G06F 3/0482* (2013.01); *G06F 3/04817* (2013.01);
(Continued)

(58) Field of Classification Search
CPC ... H04L 41/22; G06F 16/178; G06F 3/04847; G06F 3/0482; G06F 3/04817
See application file for complete search history.

(56) References Cited

U.S. PATENT DOCUMENTS 5,862,346 A    1/1999  Kley et al.
5,966,714 A *  10/1999 Huang ............... G07B 17/0008
                                                       718/1
(Continued)

OTHER PUBLICATIONS

Non-Final Office Action from U.S. Appl. No. 15/991,895, dated Nov. 18, 2019, 11 pages.
(Continued)

*Primary Examiner* — Phenuel S Salomon
(74) *Attorney, Agent, or Firm* — Keller Preece PLLC

(57) ABSTRACT

In a synchronization system, the present invention provides an improved user interface through which a user can view and manage settings associated with the user's account in the synchronization system. In the preferred embodiment, a column is displayed for each electronic device associated with the user's account in the synchronization system. In each column is a visual representation of items (e.g., folders) that are (1) backed up, remotely accessible and/or synchronized in the synchronization system and (2) located on the electronic device associated with such column. For each item that is synchronized across multiple devices, all the visual representations of such item in the columns are aligned across a single row in the interface. In the preferred embodiment, there is an arrow, or other visual indicator, between the visual representations of such items to indicate that the items are synchronized.

20 Claims, 12 Drawing Sheets

Related U.S. Application Data continuation of application No. 15/991,895, filed on May 29, 2018, now Pat. No. 10,715,401, which is a continuation of application No. 14/871,967, filed on Sep. 30, 2015, now Pat. No. 10,009,233, which is a continuation of application No. 14/175,256, filed on Feb. 7, 2014, now Pat. No. 9,654,348, which is a continuation of application No. 12/799,832, filed on May 3, 2010, now Pat. No. 8,650,498.

(60) Provisional application No. 61/215,396, filed on May 4, 2009.

(51) Int. Cl.
*G06F 16/178* (2019.01)
*G06F 3/04817* (2022.01)
*G06F 3/04847* (2022.01)

(52) U.S. Cl.
CPC ........ *G06F 3/04847* (2013.01); *G06F 16/178* (2019.01); *H05K 999/99* (2013.01)

(56) References Cited

U.S. PATENT DOCUMENTS

| | | | |
|---|---|---|---|
| 6,018,762 A * | 1/2000 | Brunson | G06Q 10/107 709/248 |
| 6,034,621 A | 3/2000 | Kaufman | |
| 6,324,544 B1 * | 11/2001 | Alam | G06F 16/10 |
| 6,345,313 B1 * | 2/2002 | Lindholm | G06F 9/526 718/100 |
| 6,348,932 B1 | 2/2002 | Nishikawa et al. | |
| 6,407,750 B1 | 6/2002 | Gioscia et al. | |
| 6,636,873 B1 | 10/2003 | Carini et al. | |
| 6,636,888 B1 | 10/2003 | Bookspan et al. | |
| 6,904,185 B1 | 6/2005 | Wilkins et al. | |
| 7,039,723 B2 | 5/2006 | Hu et al. | |
| 7,080,104 B2 | 7/2006 | Ring et al. | |
| 7,103,357 B2 | 9/2006 | Kirani et al. | |
| 7,139,555 B2 | 11/2006 | Apfel | |
| 7,319,536 B1 | 1/2008 | Wilkins et al. | |
| 7,321,919 B2 | 1/2008 | Jacobs et al. | |
| 7,369,161 B2 | 5/2008 | Easwar et al. | |
| 7,372,485 B1 | 5/2008 | Bodnar et al. | |
| 7,441,180 B1 | 10/2008 | Kaczmarek et al. | |
| 7,502,795 B1 | 3/2009 | Svendsen et al. | |
| 7,576,752 B1 | 8/2009 | Benson et al. | |
| 7,680,067 B2 | 3/2010 | Prasad et al. | |
| 7,707,500 B2 | 4/2010 | Martinez | |
| 7,739,411 B2 | 6/2010 | Messer et al. | |
| 7,747,596 B2 | 6/2010 | Bigioi et al. | |
| 7,774,326 B2 | 8/2010 | Arrouye et al. | |
| 7,809,682 B2 | 10/2010 | Paterson et al. | |
| 7,930,270 B2 | 4/2011 | Tsang | |
| 8,296,367 B2 | 10/2012 | Callanan et al. | |
| 8,321,374 B2 * | 11/2012 | Holt | G06F 16/273 707/625 |
| 8,650,498 B1 | 2/2014 | Mihovilovic | |
| 9,654,348 B2 | 5/2017 | Mihovilovic et al. | |
| 2002/0013852 A1 | 1/2002 | Janik | |
| 2002/0044159 A1 | 4/2002 | Kuroiwa et al. | |
| 2002/0059604 A1 | 5/2002 | Papagan et al. | |
| 2002/0065848 A1 | 5/2002 | Walker et al. | |
| 2002/0066050 A1 | 5/2002 | Lerman et al. | |
| 2002/0099772 A1 | 7/2002 | Deshpande et al. | |
| 2002/0129096 A1 | 9/2002 | Mansour et al. | |
| 2002/0194177 A1 * | 12/2002 | Sherman | G06F 16/273 |
| 2003/0004952 A1 | 1/2003 | Nixon et al. | |
| 2003/0014478 A1 | 1/2003 | Noble | |
| 2003/0131098 A1 | 7/2003 | Huntington et al. | |
| 2003/0159136 A1 | 8/2003 | Huang et al. | |
| 2003/0218633 A1 | 11/2003 | Mikhail et al. | |
| 2004/0024979 A1 | 2/2004 | Kaminsky et al. | |
| 2004/0044732 A1 | 3/2004 | Fushiki et al. | |
| 2004/0088420 A1 | 5/2004 | Allen et al. | |
| 2004/0148207 A1 | 7/2004 | Smith et al. | |
| 2004/0148375 A1 | 7/2004 | Levett et al. | |
| 2005/0044164 A1 | 2/2005 | O'Farrell et al. | |
| 2005/0165869 A1 | 7/2005 | Huang et al. | |
| 2006/0052091 A1 | 3/2006 | Onyon et al. | |
| 2006/0069809 A1 | 3/2006 | Serlet | |
| 2006/0156239 A1 | 7/2006 | Jobs et al. | |
| 2006/0242206 A1 | 10/2006 | Brezak et al. | |
| 2007/0005581 A1 | 1/2007 | Arrouye et al. | |
| 2007/0005707 A1 | 1/2007 | Teodosiu et al. | |
| 2007/0043830 A1 | 2/2007 | Housenbold et al. | |
| 2007/0156434 A1 | 7/2007 | Martin et al. | |
| 2007/0179989 A1 | 8/2007 | Maes | |
| 2007/0180075 A1 | 8/2007 | Chasman et al. | |
| 2007/0209005 A1 * | 9/2007 | Shaver | G06F 16/958 707/E17.116 |
| 2007/0250645 A1 | 10/2007 | Meadows et al. | |
| 2007/0276836 A1 | 11/2007 | Chatterjee et al. | |
| 2007/0282848 A1 | 12/2007 | Kiilerich et al. | |
| 2008/0109448 A1 | 5/2008 | Aboel-Nil et al. | |
| 2008/0126936 A1 | 5/2008 | Williams | |
| 2008/0168185 A1 * | 7/2008 | Robbin | G06F 16/182 709/248 |
| 2008/0208870 A1 | 8/2008 | Tsang | |
| 2009/0094252 A1 | 4/2009 | Wong et al. | |
| 2009/0144343 A1 | 6/2009 | Holt et al. | |
| 2009/0183060 A1 | 7/2009 | Heller et al. | |
| 2009/0187609 A1 | 7/2009 | Barton et al. | |
| 2010/0063670 A1 | 3/2010 | Brzezinski et al. | |
| 2012/0263166 A1 | 10/2012 | Cho et al. | |
| 2014/0059002 A1 | 2/2014 | Lockhart et al. | |
| 2016/0028593 A1 | 1/2016 | Mihovilovic et al. | |
| 2016/0210195 A1 | 7/2016 | Sinha | |

OTHER PUBLICATIONS

Non-Final Office Action from U.S. Appl. No. 16/917,653, dated Oct. 16, 2020, 6 pages.
Notice of Allowance from U.S. Appl. No. 15/991,895, dated Apr. 29, 2020, 8 pages.
Notice of Allowance from U.S. Appl. No. 16/917,653, dated Dec. 16, 2020, 8 pages.
Notice of Allowance for U.S. Appl. No. 12/799,832 dated Oct. 8, 2013, 10 pages.
Notice of Allowance for U.S. Appl. No. 14/175,256 dated Jan. 17, 2017, 7 pages.
Notice of Allowance for U.S. Appl. No. 14/871,967 dated Mar. 22, 2018, 12 pages.
Office Action for U.S. Appl. No. 12/799,832 dated Apr. 12, 2013, 15 pages.
Office Action for U.S. Appl. No. 14/175,256 dated Mar. 2, 2016, 21 pages.
Office Action for U.S. Appl. No. 14/175,256 dated Sep. 14, 2016, 20 pages.
Office Action for U.S. Appl. No. 14/871,967 dated May 3, 2017, 22 pages.
Office Action for U.S. Appl. No. 14/871,967 dated Nov. 16, 2017, 18 pages.

* cited by examiner

USER INTERFACE FOR VIEWING ITEMS IN A SYNCHRONIZATION SYSTEM

CROSS REFERENCE TO OTHER APPLICATIONS

This present application is a continuation of U.S. patent application Ser. No. 16/917,653, filed Jun. 30, 2020, which is a continuation of U.S. patent application Ser. No. 15/991,895, filed May 29, 2018, now issued as U.S. Pat. No. 10,715,401, which is a continuation of U.S. patent application Ser. No. 14/871,967, filed Sep. 30, 2015, now issued as U.S. Pat. No. 10,009,233, which is a continuation of U.S. patent application Ser. No. 14/175,256, filed Feb. 7, 2014, now issued as U.S. Pat. No. 9,654,348, which is a continuation of U.S. patent application Ser. No. 12/799,832, filed May 3, 2010, now issued as U.S. Pat. No. 8,650,498, which claims priority to U.S. Provisional Patent Application 61/215,396, filed May 4, 2009. Each of the aforementioned patents and applications are hereby incorporated by reference in their entirety.

BACKGROUND OF THE INVENTION

1. Field of the Invention

This invention relates generally to synchronization/back-up server systems, and, more specifically, to a user interface for managing and viewing synchronization settings in a synchronization system.

2. Description of the Background Art

Synchronization systems enable users to back up, remotely access, share, and/or synchronize files and data objects. Files and data objects can be backed up to a central synchronization server or other device, such as a Network Accessed Storage (NAS) device. Files and data objects can also be synchronized across multiple electronic devices, such as, for example, a user's work computer, 'home computer, and mobile phone. An example of a synchronization system that enables users to remotely access, share, back up and synchronize files is Sharpcast, Inc.'s SUGARSYNC system.

In known synchronization systems, there is a usually a client application on each electronic device on which files are accessed or synchronized by the synchronization system. Such client application provides a user interface through which user can configure back up, remote access, share, and synchronization settings for files/data objects located on the local device on which the client application resides. Known client applications provide a primarily textual description or listing of the settings for the user's account in the synchronization system. As the number of electronic devices associated with a user's account in the synchronization system increases, it can be difficult for a user to see and track all the synchronization settings when they are in text form. Consequently, there is a need for an improved user interface through which a user can view and manage settings in the synchronization system.

SUMMARY OF THE INVENTION

The present invention provides an improved user interface through which a user can view and manage settings associated with the user's account in the synchronization system. In the preferred embodiment, the user interface has a column for each electronic device (e.g., computer, NAS, set-top box, mobile phone, digital picture frame, personal digital assistant (PDA), etc.) associated with the user's account in the synchronization system. Displayed within each column are visual representations of items on the corresponding device that have been added to the user's account. Item's "added" to a user's account are items which are backed up, remotely accessible, shared, or synchronized in the synchronization system.

For items in the user's account that are synchronized with each other across two or more electronic devices, all the visual representations of such items in the applicable columns are horizontally aligned in the interface. In the preferred embodiment, the user interface displays an arrow, line, or other visual indicator of synchronization, between two items synchronized with each other across devices.

Also, in the preferred embodiment, the user interface is horizontally divided into two sections—one for items that are synchronized across multiple devices and one for items that have been added to the user's account (for remote access, sharing, or back up purposes) but are not synchronized across multiple devices. In other words, in such embodiment, each column associated with an electronic device has two sections, one showing the items on that device that are synchronized across one or more other devices, and one showing items on that device that have been added to the user's account for remote access or back up.

In a further embodiment of the invention, the user interface enables the user to perform functions related to his account in the synchronization system. For example, the user can add an item to his account from a local device, remove an item on the local device from his account, and synchronize a remote item with an item on the local device.

Those skilled in the art will appreciate that instead of creating a column for each electronic device in the user interface, a row could be created for each electronic device, and synchronized items can be aligned along a vertical column in the user interface.

DETAILED DESCRIPTION OF THE PREFERRED EMBODIMENTS

Figure 1:
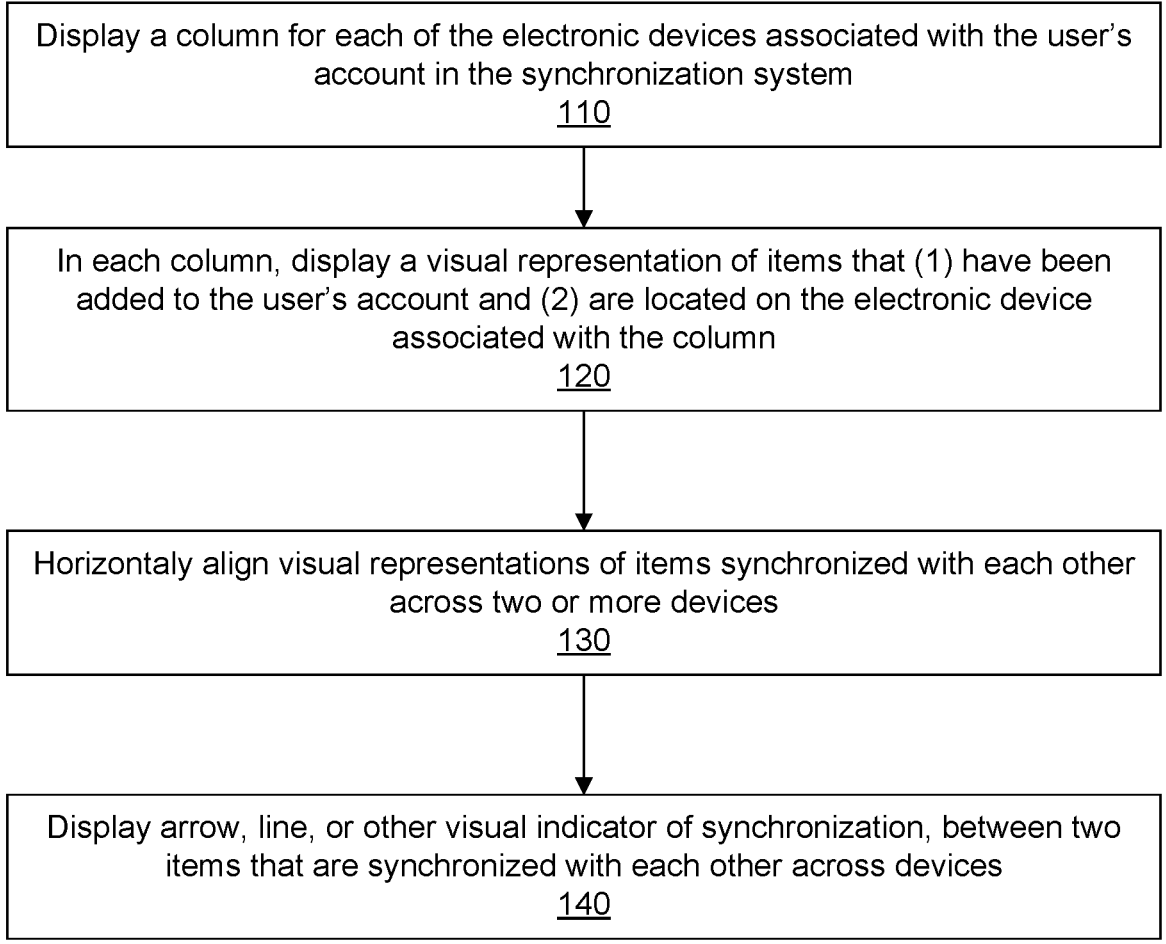
FIG. 1 is a flowchart that illustrates a method for displaying settings for a user's account in a synchronization system.

FIG. 1 illustrates a method for displaying settings for a user's account in a synchronization system. In one embodiment, the method is implemented by a client application that runs on an electronic device and that generates a user interface through which a user can select items on the electronic device for back up, remote access, sharing, or synchronization in the synchronization system (the "client UI application").

In generating the user interface, the client UI application displays a column for each of the electronic devices associated with the user's account in the synchronization system (step 110). In each column associated with an electronic device, the client UI application displays a visual representation of items on such electronic device that have been added to the user's account in the synchronization system (step 120). An item has been added to the user's account, when the user designates the items for back up, remote access, sharing, or synchronization using the synchronization system.

For items in the user's account that are synchronized with each other across two or more electronic devices, all the visual representations of such items in the applicable columns are horizontally aligned in the interface (step 130). In the preferred embodiment, the client UI application inserts an arrow, line, or other visual indicator of synchronization, between two items synchronized with each other across devices (step 140).

In an alternate embodiment, the client UI application displays a horizontal row, instead of a vertical column, for each of the electronic devices associated with the user's account in the synchronization system. In such embodiment, items that are synchronized across multiple user devices are aligned vertically (along a column) instead of horizontally.

"Items" as user herein can include any folder, file, directory, or data object on an electronic device. In the preferred embodiment, items are directory "folders" that can include documents, photos, music files, and video files. Electronic devices include, but are not limited to, computers, mobile phones, personal digital assistants (PDA), network-accessed storage devices, digital picture frames, televisions with storing and computing capability, and set-top boxes.

Figure 2:
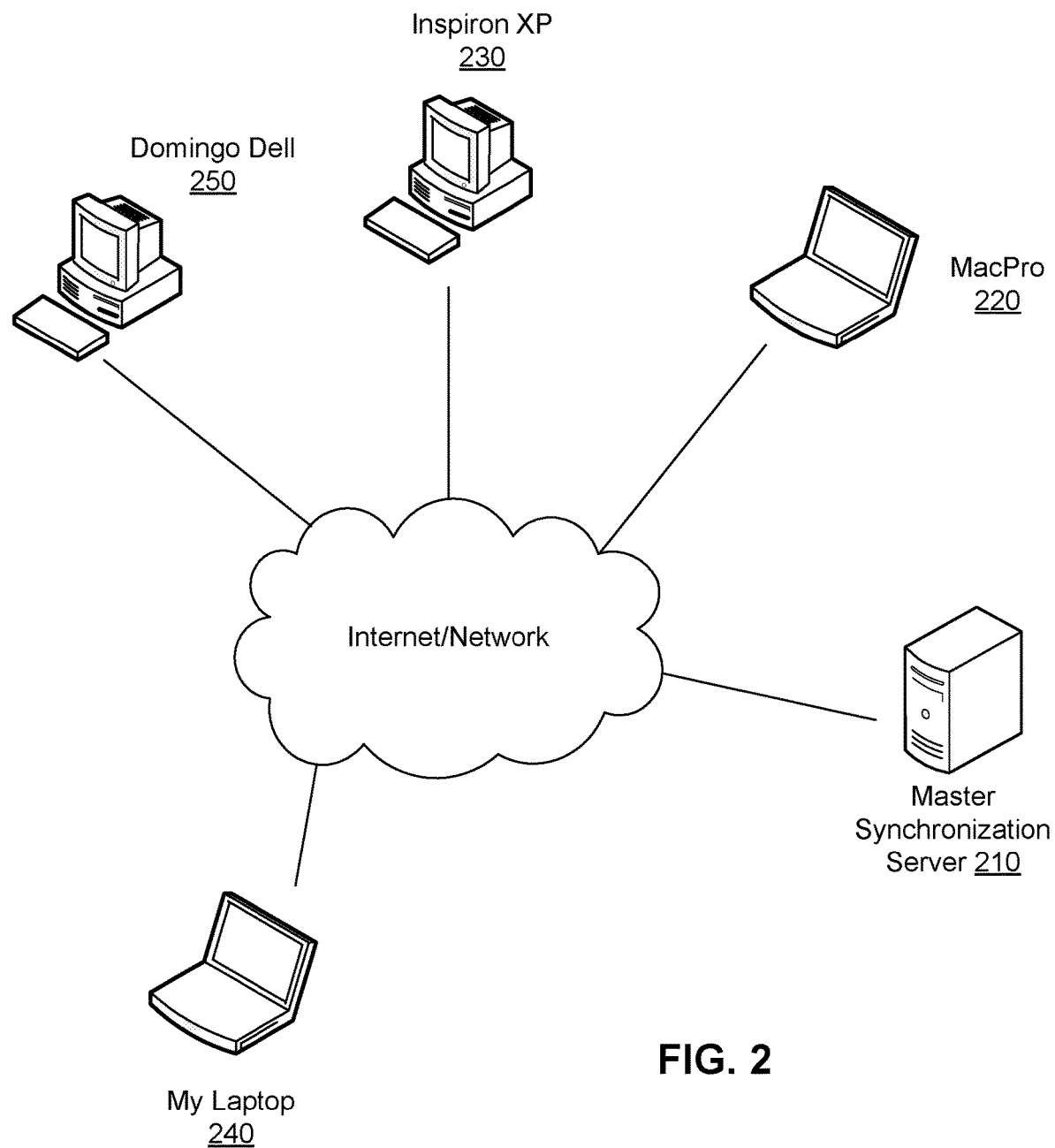
FIG. 2 illustrates the devices associated with a user's account in an example scenario.
Figure 3:
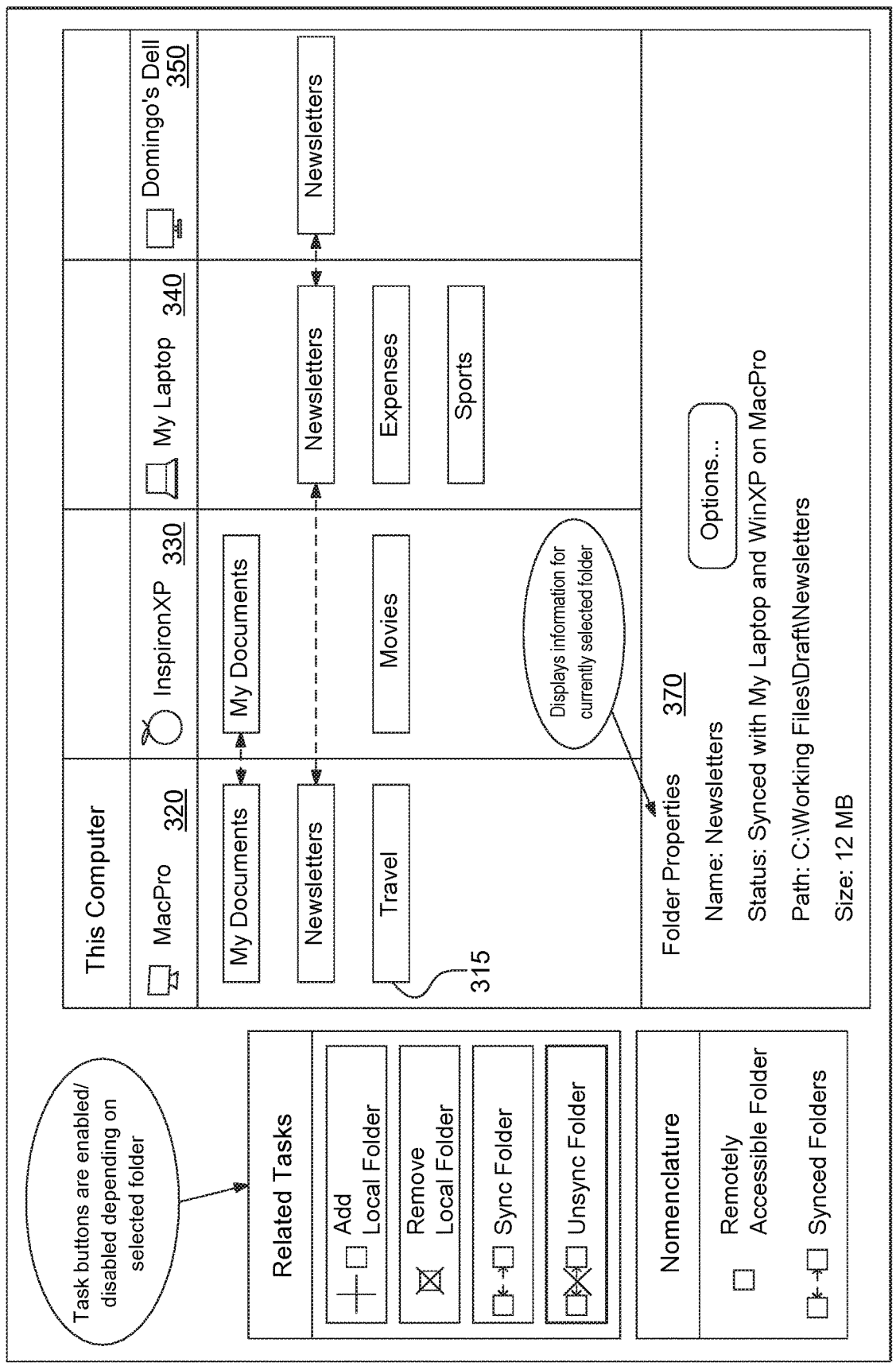
FIGS. 3, 4, 5, 6a-6e are screen shots that illustrate examples of a user interface for displaying settings for a user's account in a synchronization system.

An example of a user interface generated by the client UI application in accordance with the present invention is illustrated in FIG. 3, with reference to FIG. 2. FIG. 2 illustrates an example scenario in which a user has associated electronic devices 220-250 with this user's account in a synchronization system 200. The system 200 includes a central synchronization server 210 to which items can be backed up. The synchronization server also can facilitate the synchronization of items among the electronic devices 220-250. In this example, the user has named the electronic devices 220-250 associated with his account "MacPro" (220), "InspironXP" (230), "My Laptop" (240), and "Domingo Dell" (250). Each of the devices 220-250 has a client UI application that provides a user interface in accordance with the method of FIG. 1.

In FIG. 3, the "MacPro" is identified as "This Computer" (i.e., the local computer), and, thus, this interface is generated by the client UI application on the MacPro computer 220. Each of user devices 220-250 is associated with its own column 320-350, respectively. In one embodiment of the invention, the local computer (in this case MacPro computer 220) is always assigned to a particular column. In this example (as well as the example of FIG. 4), the local computer is always associated with the left-most column.

Each column 320-350 has a visual representation of the folders that have been added to the user's account on each of devices 220-250. For example, column 320 illustrates that the user has added folders titled "My Documents," "Newsletters," "and "Travel" on the MacPro computer 220 to the user's account, and column 330 illustrates that the user has added folders titled "My Documents" and "Movies" on the InspironXP 230 to the user's account.

The arrows between visual representations of the "My Document" folders in columns 320 and 330 indicate that these folders are synchronized between the MacPro 220 and InspironXP 230. Similarly, the arrows between the visual representations of the "Newsletters" folders in columns 320, 330, and 350 indicate that these folders are synchronized across MacPro 220, My Laptop 240, and Domingo's Dell 250.

The folders that are not synchronized across multiple user devices do not have any arrows connecting them to any other folders. In this example, visual representations of such folders in a column indicate such folders are backed up by the synchronizations system and/or available for remote access through the synchronization. For example, the visual representation 315 of the "Travel" folder on the MacPro 220 indicates that the "Travel" folder is backed up and/or available for remote access in the synchronizations system. A folder that is back-up on the central synchronization server 210 is synchronized with the central synchronization server 210.

Figure 4:
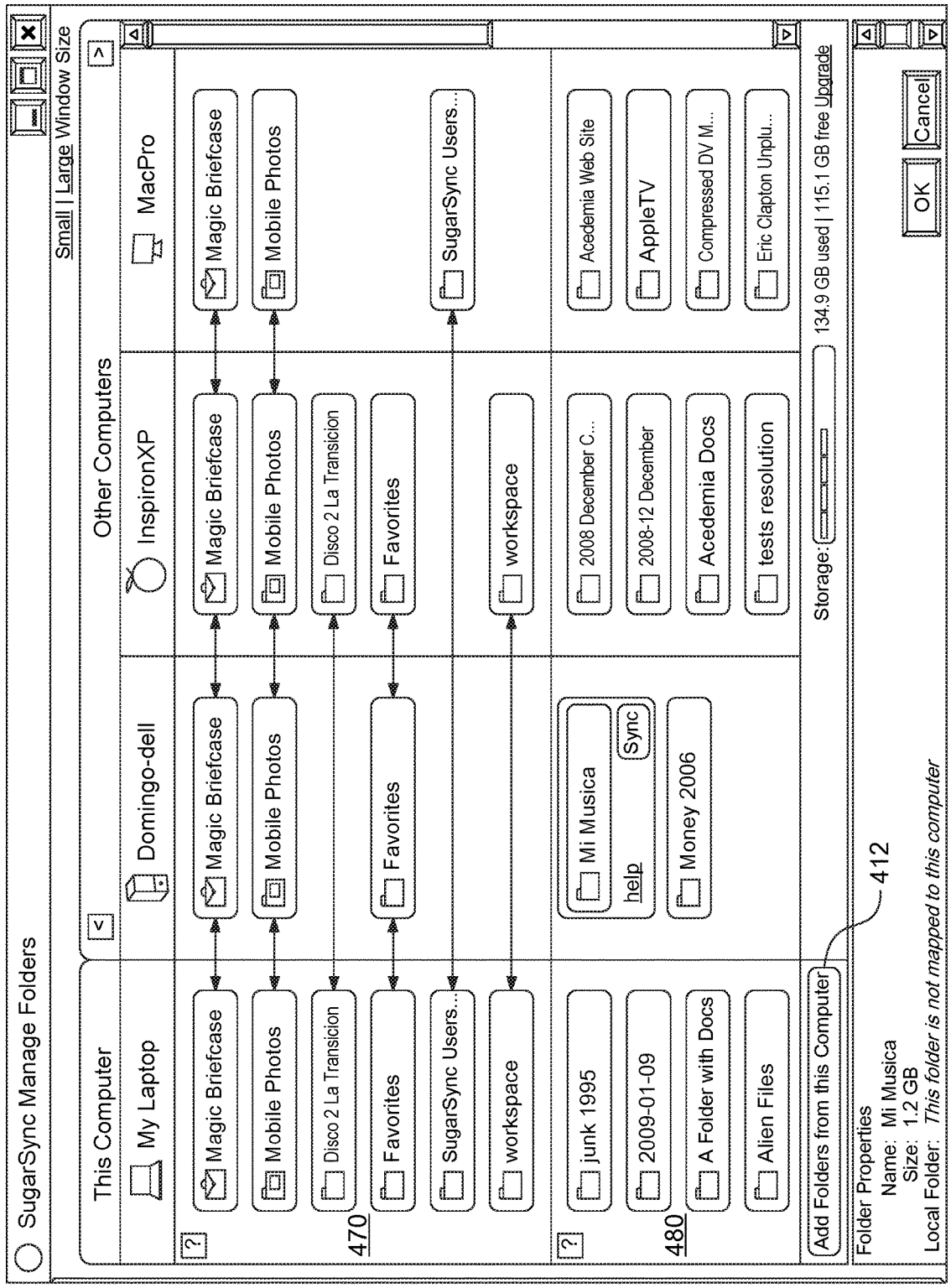

FIG. 4 illustrate another example of a user interface generated by a client UI application in accordance with the method of FIG. 1. Like the example in FIG. 3, each of the user's devices is associated with a column in the user interface. However, in addition, the user interface is divided horizontally into two sections 470 and 480. In the top section 470, the client UI application illustrates folders that are synchronized across two or more client devices. In the bottom section 480, the client application illustrates folders that are backed up and/or available for remote access or sharing, but not synchronized across multiple devices.

In one embodiment, the user interface generated by the client UI application includes a section that displays information related to a folder selected in the interface. In FIG. 3, "Folder Properties" section 370 displays the name, status, directory path, and size of the currently-selected folder.

Figure 5:
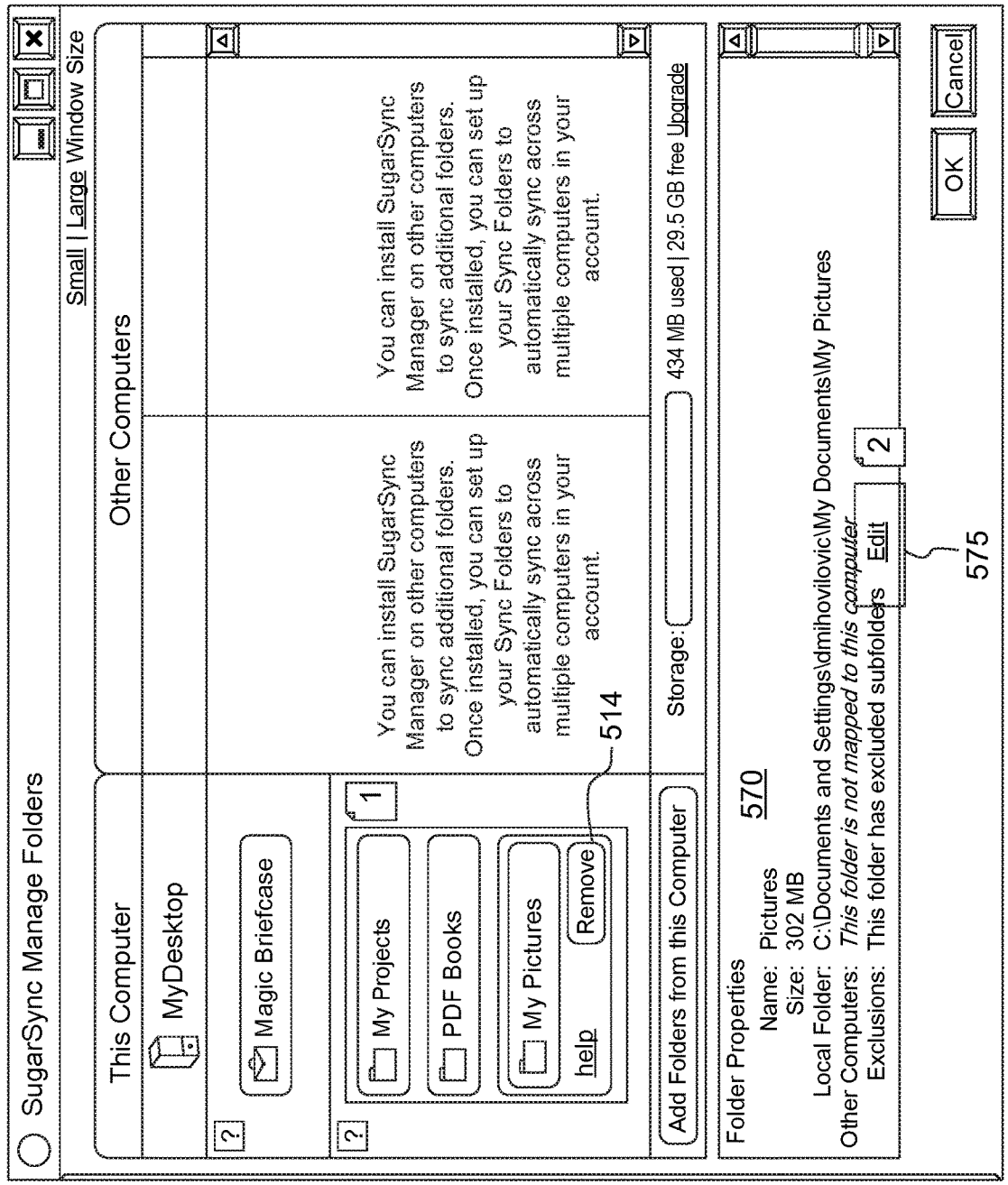

In one embodiment, the client UI application enables the user to add or remove folders (or, if applicable, other items) from the local device on which the client application is running. For example, in FIG. 4, button 412 enables the user to add folders from the user device "My Laptop" to the user's account. As another example, FIG. 5 illustrates a "remove" button 514 that appears when a user selects a folder in the column associated with the local device.

When a user adds a folder to his account, the user has the option of excluding subfolders from the folder. FIG. 5 illustrates an example of this. In the Folder Properties section 570, a user can select the "edit" link 575 to identify the folders he wants to exclude from a folder. In this embodiment, the edit link 575 appears in the Folder Property section 570 when the user selects a folder in the "This Computer" column 520.

The client UI application also enables the user to synchronize folder from a remote device to the local device on which the UI application is running. A folder on a remote device is referred to herein as a "remote folder." FIGS. 6 and 7 illustrate an example dialog flow in the user interface when a user synchronizes a remote folder to the local device on which the client UI application is running.

When the user selects a remote folder (or, more specifically, a visual representation of the remote folder) in the user interface, the client application displays a sync option, such as sync button 616 illustrated in FIG. 6 (step 710). If the user chooses the sync option, the user is prompted to pick a destination for the selected folder on the local device (see, for example, the dialog box in FIG. 6*b*) (step 720). The user can choose a new folder or an existing folder on the local device.

If the user chooses a new folder on the local device, all the components of the selected remote folder will be copied to the new folder on the local device (step 730). Thereafter, the two folders will be automatically kept in sync. The new folder is added the column associated with the local device (740). If the user chooses an existing folder on the local device, the contents of such existing folder and the selected remote folder will be merged, and, thereafter, automatically kept in sync (step 750). The existing folder is added to the column associated with the local device (step 760).

Figure 6A:
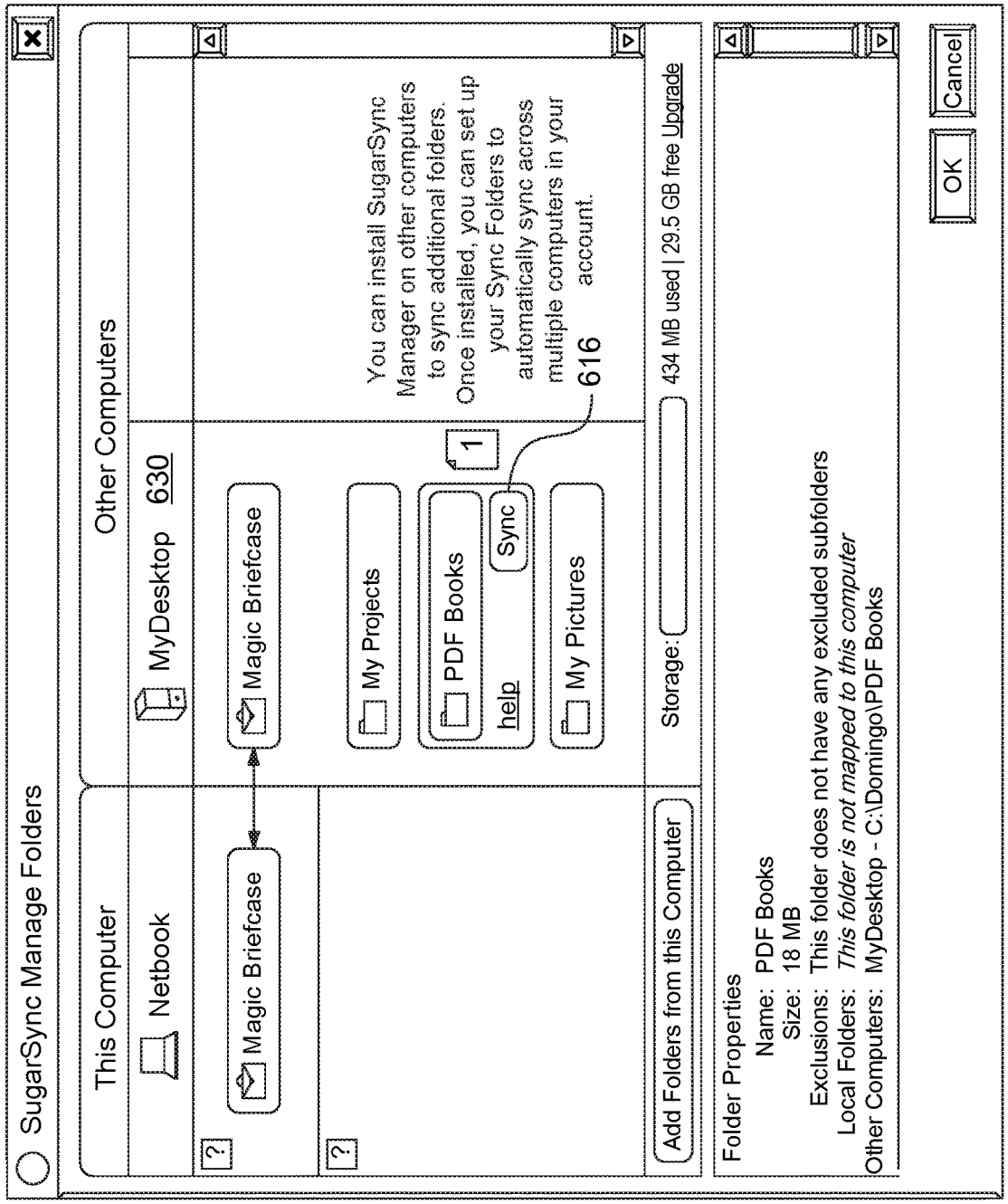
Figure 6B:
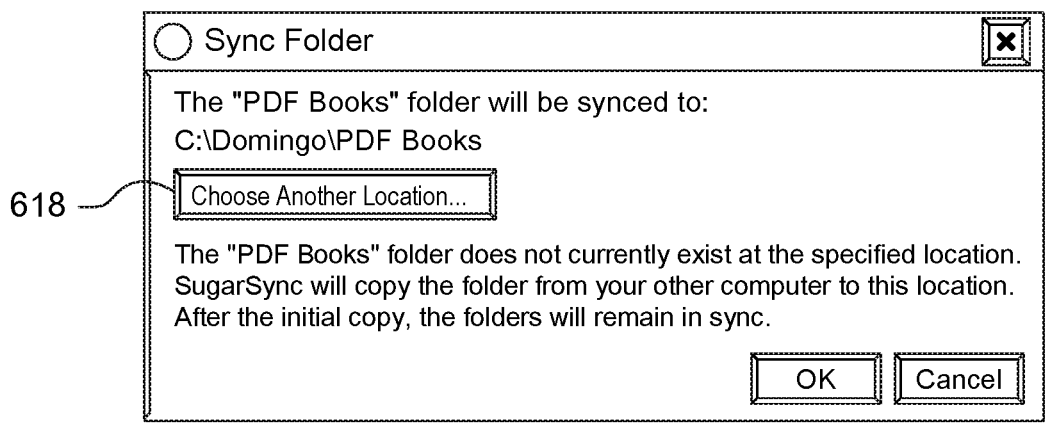
Figure 6C:
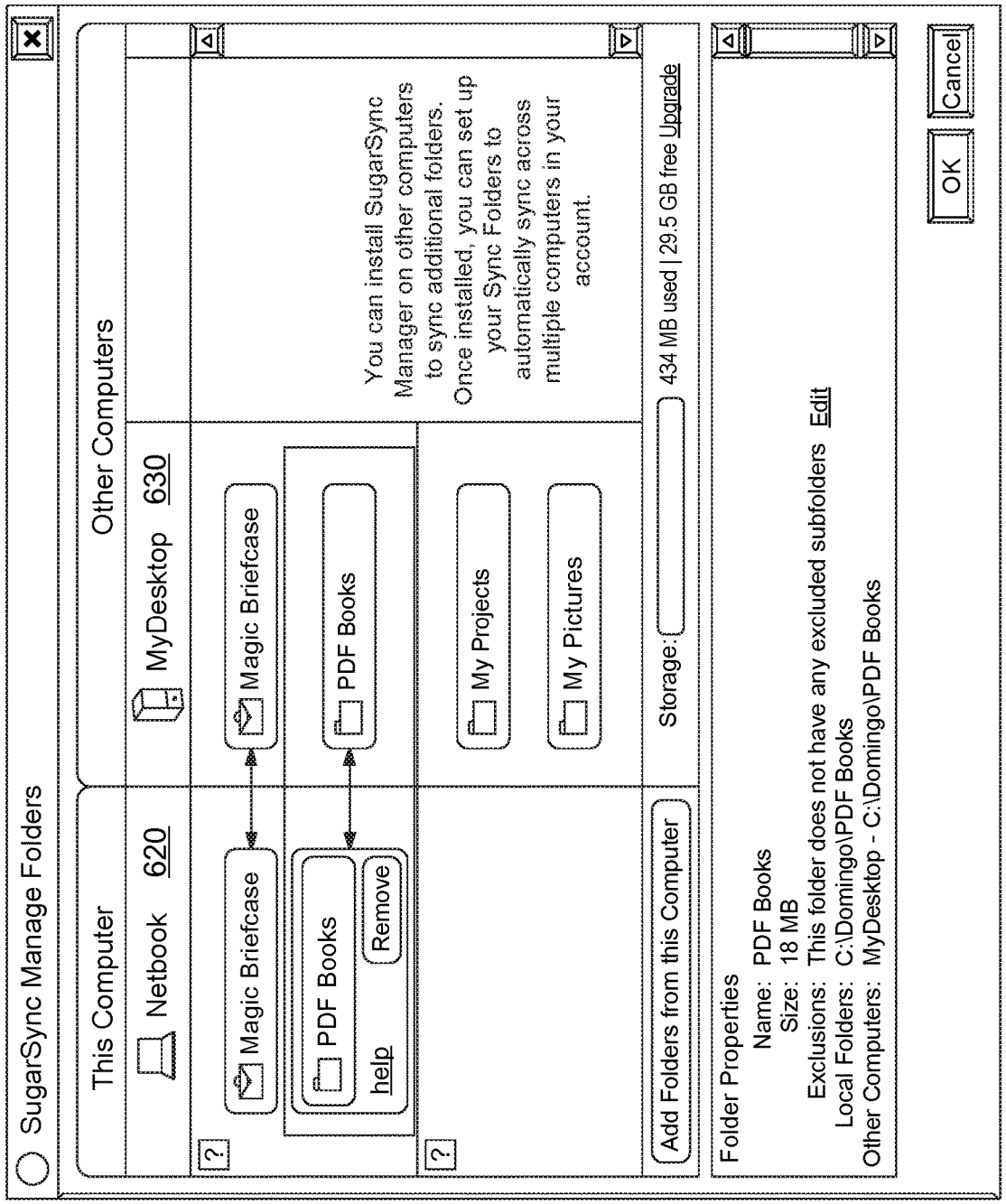
Figure 7:
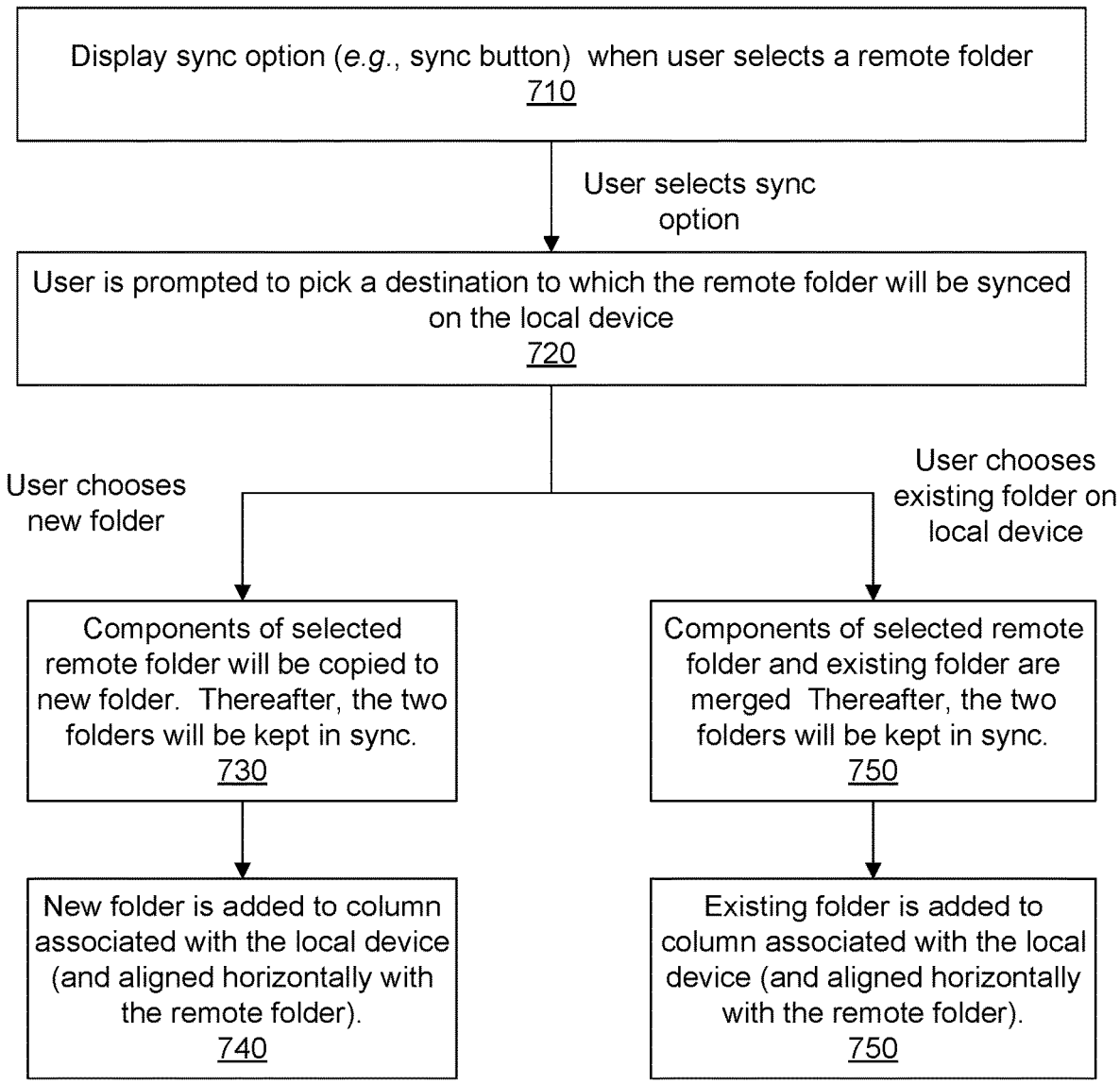
FIG. 7 is a flowchart, according to one embodiment of the invention, that illustrates a dialog flow when the user synchronizes a remote folder to a local device.

In FIG. 6*a*, the user has selected the remote folder "PDF Books" in the "My Desktop" column 630 and sync button 616 is displayed. When the user clicks on the Sync button 616, the dialog box in FIG. 6*b* appears. In this case, the default destination shown in the dialog box is a new folder "PDF Books" on the "Netbook" device (the local device), but the user can select button 618 to choose another destination (i.e., another folder on the Netbook device). The user clicks "OK" to select the default destination, and the folder "PDF books" appears in column 620, as shown in FIG. 6*c*. The arrow between the folders "PDF Books" in columns 620 and 630 indicates these folders are synced. A user can stop syncing the PDF Books folder to the "Netbook" device by selecting the folder "PDF Books" in column 620 and clicking on the "Remove" button 625.

Figure 6D:
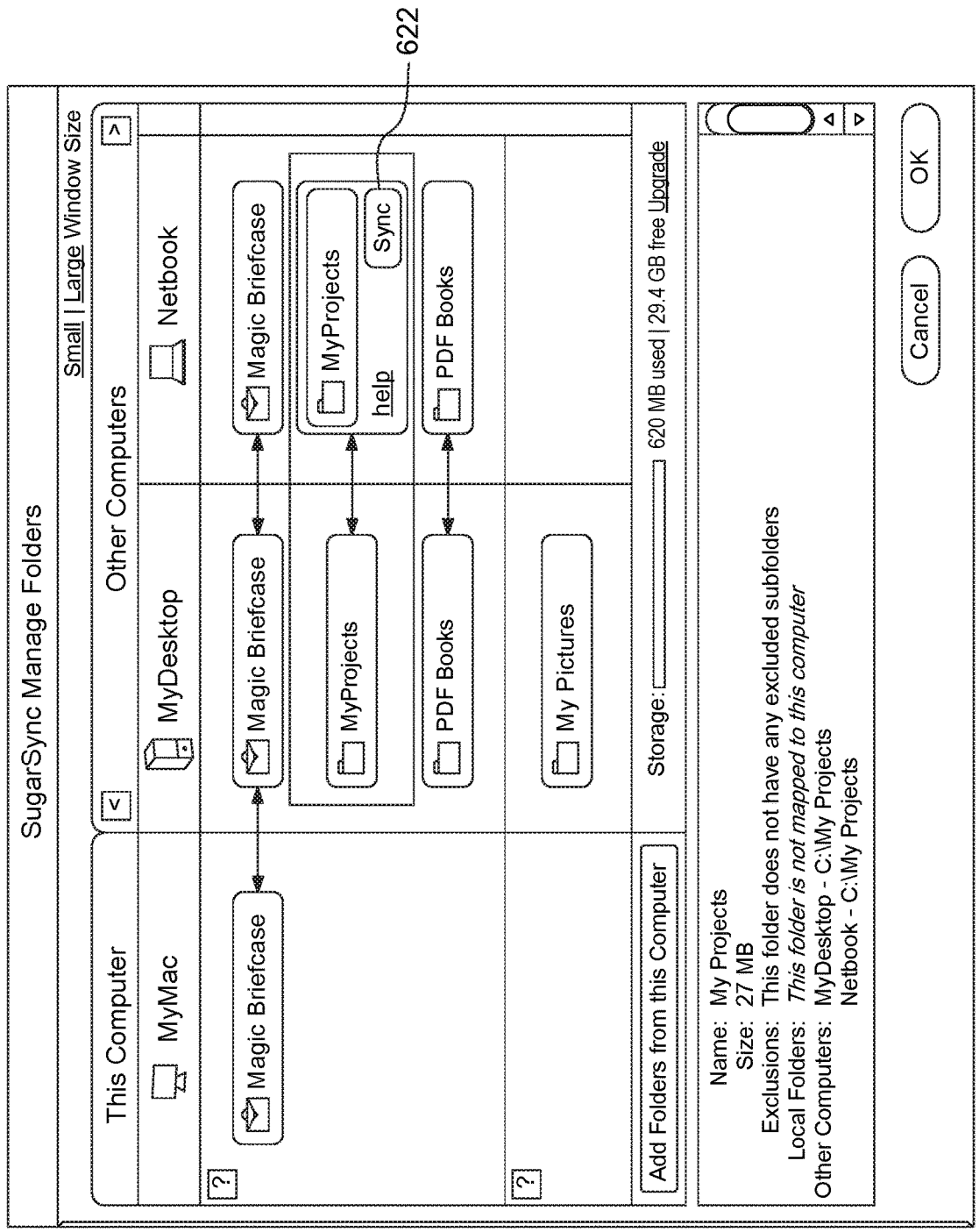
Figure 6E:
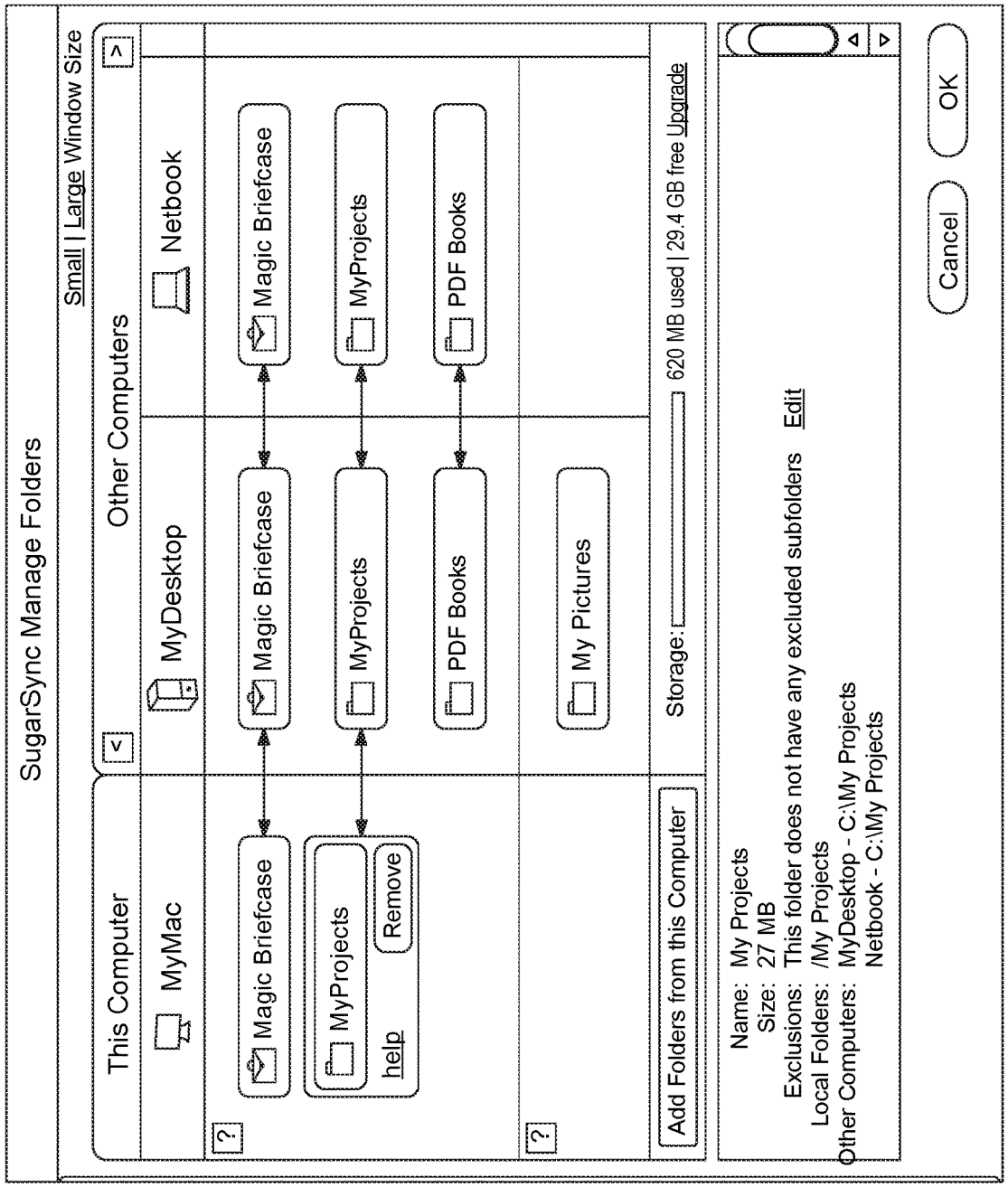

FIGS. 6*d* and 6*e* illustrate a continuation of the foregoing scenario. In this case the user has added the device "MyMac" to the user's account and is using the client UI application on the "MyMac" device. In FIG. 6*d*, the user interface illustrates that the folders "My Project" are synced between the user devices "MyDesktop" and "Netbook." By selecting the "My Projects" folder in either the "MyDesktop" column or the "Netbook" column and then click the sync button (e.g., button 622), the user also can sync this folder to the local computer "MyMac." FIG. 6*e* illustrates the resulting user interface after the user has done this.

In the embodiment described with respect to FIG. 3-7, the user can only add or remove local folders. In other words, to add a folder from a device to his account, the user must do so with the Client UI application on the device on which the folder resides. In an alternate embodiment of the invention, the user is able to remotely add and remove folders from his account through the user interface.

Figure 8:
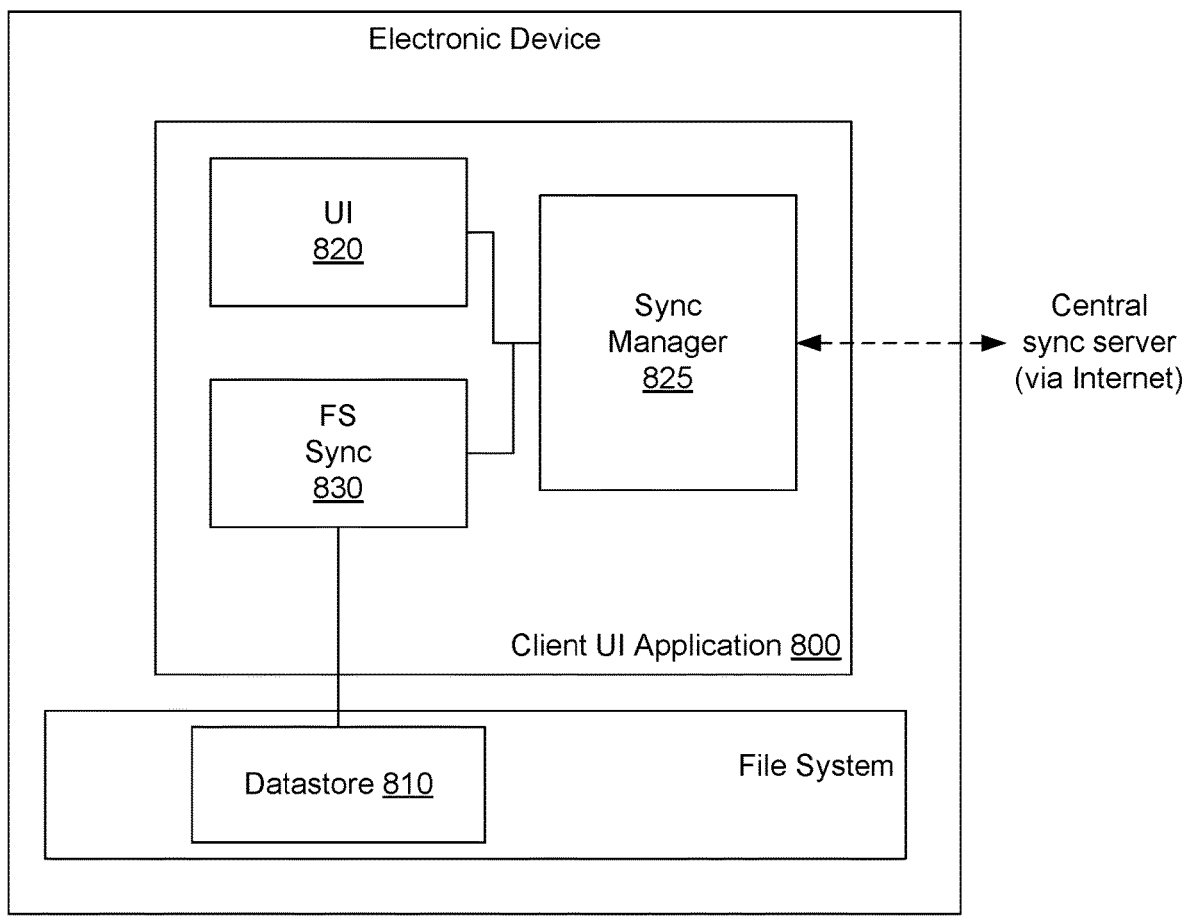
FIG. 8 is a block diagram of an example software architecture of a client UI application according to one embodiment of the invention.

FIG. 8 illustrates one embodiment of a software architecture for the client UI application 800. The architecture illustrated in FIG. 8 is an example and not intended to be limiting of the invention.

Referring to FIG. 8, the client UI application 800 includes a File System Sync Module 830 which monitors a Datastore 810 on an electronic device for changes. The Datastore 810 includes the items that the user has added to his account in the synchronization system (e.g., the folders the user is backing up or synchronizing). When the electronic device is online the Sync Manager 825 maintains a dedicated connection with a sync server in the synchronization system (such as central synchronization server 210 in FIG. 2). The Sync Manager 825 notifies the sync server of any changes to the Datastore 810. Also, the Sync Manager 825 receives notice of changes on the user's other electronic devices if such changes are relevant to the local client device (e.g., the changes are to a remote folder that is synchronized with a folder on the local client device.). In accordance with the methods described herein, the UI module 820 generates a user interface through which a user can view and manage settings in his account in the synchronization system. The Sync Manager 825 provides the UI module 820 with the information about the user's account that the UI module 820 displays in the user interface (e.g., the electronic devices associated with the user's account, the items added to the user's account, etc.). When a user makes a change to his account through the user interface, the UI module 820 notices the Sync Manager 825 so that the Sync Manager 825 can notify the central sync server and the File System Sync module 830 as necessary.

The methods for generating a user interface described herein are not limited to client UI applications on the user's electronic devices. The central synchronization server may also have a UI application that generates a user interface that a user can access through a web browser. Such server UI application can generate a user interface in accordance with FIG. 1 and the other features described herein.

Systems and methods for backing up data, synchronizing data, sharing data, and/or providing remote access to data are described in detail in the below-listed patent application, all of which are incorporated by reference herein as if fully disclosed herein:

1. U.S. patent application Ser. No. 12/157,772, titled "Method and Apparatus for File Sharing and Synchronization System," and filed on Jun. 13, 2008.

2. U.S. patent application Ser. No. 11/636,458, titled "Efficient Synchronization of Changes to Images," and filed on Dec. 8, 2006.

3. U.S. patent application Ser. No. 12/383,387, titled "Opportunistic Peer-to-Peer Synchronization in a Synchronization System," and filed on Mar. 24, 2009.

4. U.S. patent application Ser. No. 12/383,693, titled "System and Method for Multi-Tier Synchronization," and filed on Mar. 26, 2009.

As will be understood by those familiar with the art, the invention may be embodied in other specific forms without departing from the spirit or essential characteristics thereof. Accordingly, the above disclosure of the present invention is intended to be illustrative and not limiting of the invention.

What is claimed is:

1. A method, comprising:
   providing, for presentation on a client device, a graphical user interface comprising a listing of items stored locally on the client device;
   providing, within the graphical user interface, a selectable graphical element associated with a first item from the listing of items;
   synchronizing the first item with a synchronization system based on detecting a user selection of the selectable graphical element associated with the first item;
   based on synchronizing the first item with the synchronization system, providing a first visual indication for display within the graphical user interface that indicates the first item is synchronized between the synchronization system and the client device; and
   providing a second visual indication for display within the graphical user interface that indicates a second item from the listing of items stored locally on the client device is not synchronized between the synchronization system and the client device.

2. The method of claim 1, wherein the first item within the listing of items is a folder comprising one or more additional items.

3. The method of claim 1, wherein synchronizing the first item with the synchronization system comprises at least one of:
   providing a copy of the first item for storage on a synchronization server; or
   providing a copy of the first item for storage on a remote client device.

4. The method of claim 1, further comprising:
provide, within the graphical user interface, an unsync selectable graphical element associated with the first item; and
unsynchronizing the first item from the synchronization system based on detecting a user selection of the unsync selectable graphical element associated with the first item.

5. The method of claim 4, further comprising updating the first visual indication associated with the first item within the graphical user interface to indicate that the first item is no longer synchronized between the synchronization system and the client device based on unsynchronizing the first item from the synchronization system.

6. The method of claim 1, further comprising providing, within the graphical user interface, an amount of storage space on the synchronization system associated with a user account corresponding to the client device.

7. The method of claim 1, wherein synchronizing the first item with the synchronization system comprises synchronizing the first item with a mobile device by providing a copy of the first item to the mobile device.

8. The method of claim 1, further comprising:
detecting a change to the first item; and
providing notification of the change to the first item to the synchronization system.

9. A system, comprising:
at least one processor; and
a non-transitory computer readable storage medium comprising instructions that, when executed by the at least one processor, cause the system to:
provide, for display on a client device, a graphical user interface comprising a listing of items stored locally on the client device;
provide, within the graphical user interface, a selectable graphical element associated with a first item from the listing of items;
synchronize the first item with a synchronization system based on detecting a user selection of the selectable graphical element associated with the first item;
based on synchronizing the first item with the synchronization system, provide a first visual indication for display within the graphical user interface that indicates the first item is synchronized between the synchronization system and the client device; and
provide a second visual indication for display within the graphical user interface that indicates a second item from the listing of items stored locally on the client device is not synchronized between the synchronization system and the client device.

10. The system of claim 9, wherein synchronizing the first item with the synchronization system comprises at least one of:
providing a copy of the first item for storage on a synchronization server; or
providing a copy of the first item for storage on a remote client device.

11. The system of claim 9, further comprising instructions that, when executed by the at least one processor, cause the system to provide, within the graphical user interface, a selectable sync option associated with the second item.

12. The system of claim 11, further comprising instructions that, when executed by the at least one processor, cause the system to:

synchronize the second item with the synchronization system based on detecting a user selection of the selectable sync option associated with the second item; and
based on synchronizing the second item with the synchronization system, modify the second visual indication from indicating the second item is not synchronized with the synchronization system to indicating the second item is synchronized with the synchronization system.

13. The system of claim 9, further comprising instructions that, when executed by the at least one processor, cause the system to:
provide, within the graphical user interface, an unsync selectable graphical element associated with the first item; and
unsynchronize the first item from the synchronization system based on detecting a user selection of the unsync selectable graphical element associated with the first item.

14. The system of claim 9, further comprising instructions that, when executed by the at least one processor, cause the system to:
maintain an online connection between the client device and the synchronization system; and
provide, to the synchronization system, change notifications based on detecting changes to the first item on the client device.

15. A non-transitory computer readable storage medium comprising instructions that, when executed by at least one processor, cause a client device to:
display, on the client device, a graphical user interface comprising a listing of items stored locally on the client device;
provide, within the graphical user interface, a selectable graphical element associated with a first item from the listing of items;
provide the first item to a synchronization system to synchronize the first item between the client device and the synchronization system based on detecting a user selection of the selectable graphical element associated with the first item;
display a first visual indication within the graphical user interface that indicates the first item is synchronized between the synchronization system and the client device; and
display a second visual indication within the graphical user interface that indicates a second item from the listing of items stored locally on the client device is not synchronized between the synchronization system and the client device.

16. The non-transitory computer readable storage medium of claim 15, wherein providing the first item to the synchronization system to synchronize the first item with the synchronization system comprises at least one of:
providing a copy of the first item for storage on a synchronization server; or
providing a copy of the first item for storage on a remote client device.

17. The non-transitory computer readable storage medium of claim 15, further comprising instructions that, when executed by the at least one processor, cause the client device to:
provide, within the graphical user interface, an unsync selectable graphical element associated with the first item; and unsynchronize the first item from the synchronization system based on detecting a user selection of the unsync selectable graphical element associated with the first item.

18. The non-transitory computer readable storage medium of claim 17, wherein unsynchronizing the first item from the synchronization system comprises sending a notification to the synchronization system that causes the first item to be removed from other synced devices while the first item is maintained on the client device.

19. The non-transitory computer readable storage medium of claim 15, further comprising instructions that, when executed by the at least one processor, cause the client device to provide, within the graphical user interface, an amount of storage space on the synchronization system associated with a user account.

20. The non-transitory computer readable storage medium of claim 15, further comprising instructions that, when executed by the at least one processor, cause the client device to provide, to the synchronization system, change notifications based on detecting changes to the first item.

\* \* \* \* \*